United States Patent
Jenkins et al.

(10) Patent No.: US 12,418,572 B2
(45) Date of Patent: Sep. 16, 2025

(54) DYNAMIC ADJUSTMENT OF SHARED CONTENT WITHIN WEB CONFERENCES

(71) Applicant: INTERNATIONAL BUSINESS MACHINES CORPORATION, Armonk, NY (US)

(72) Inventors: Jana H. Jenkins, Raleigh, NC (US); Jeremy R. Fox, Georgetown, TX (US); John Russell Gerberich, Palatine, IL (US); Fang Lu, Billerica, MA (US)

(73) Assignee: International Business Machines Coproration, Armonk, NY (US)

( * ) Notice: Subject to any disclaimer, the term of this patent is extended or adjusted under 35 U.S.C. 154(b) by 128 days.

(21) Appl. No.: 18/366,167

(22) Filed: Aug. 7, 2023

(65) Prior Publication Data
US 2025/0055891 A1    Feb. 13, 2025

(51) Int. Cl.
*H04L 65/403*    (2022.01)
*G06F 3/04845*    (2022.01)

(52) U.S. Cl.
CPC ........ *H04L 65/403* (2013.01); *G06F 3/04845* (2013.01)

(58) Field of Classification Search
CPC ............... H04L 65/403; H04L 65/1094; G06F 3/04845; G06F 3/04842
See application file for complete search history.

(56) References Cited

U.S. PATENT DOCUMENTS

| 7,873,213 B2 | 1/2011 | Speigle |
| 2008/0141171 A1 | 6/2008 | Schowtka |
| 2017/0339249 A1 * | 11/2017 | Forster .................. G06Q 10/10 |
| 2018/0197313 A1 | 7/2018 | Chakravorty |
| 2018/0337968 A1 * | 11/2018 | Faulkner ............... H04L 51/046 |
| 2019/0356710 A1 | 11/2019 | Zeng |
| 2021/0183105 A1 | 6/2021 | Sneyers |
| 2021/0373676 A1 | 12/2021 | Jorasch |
| 2022/0334806 A1 * | 10/2022 | Lin .......................... G06F 8/20 |

FOREIGN PATENT DOCUMENTS

WO    2006054242 A2    5/2006

OTHER PUBLICATIONS

Jorg Ott et al., Floating Content: Information Sharing in Urban Areas, Mar. 1, 2011, International Conference on Pervasive Computing and Communications, pp. 140-146 (Year: 2011).*

Qian Xiao et al., Peer-Aware Collaborative Access Control in Social Networks, Oct. 1, 2012, International Conference on Collaborative Computing: Networking, Applications and Worksharing, pp. 30-39 (Year: 2012).*

"IBM Video Streaming Integration for Cisco Webex," downloaded from https://www.ibm.com/downloads/cas/XVGBBG8D, Jun. 22, 2023, 2 pages.

* cited by examiner

*Primary Examiner* — Tam T Tran
(74) *Attorney, Agent, or Firm* — James L. Olsen

(57) ABSTRACT

Aspects of the present disclosure relate to dynamic adjustment of shared content within web conferences. Web conference data associated with a web conference can be received. A determination can be made that a condition is met for adjusting shared content that is currently being shared within the web conference. An adjustment to make to the shared content that is currently being shared within the web conference can be determined. The shared content can be adjusted based on the determination to generate adjusted shared content. The adjusted shared content can be displayed within the web conference.

20 Claims, 8 Drawing Sheets

DYNAMIC ADJUSTMENT OF SHARED CONTENT WITHIN WEB CONFERENCES

BACKGROUND

The present disclosure relates generally to the field of computing, and in particular, to dynamic adjustment of shared content within web conferences.

Web conferencing software facilitates communication between individuals online via transmission of audio/video (A/V) data of the individuals in real-time over a network. Web conferences can allow users to share content (e.g., images, video data, audio data, etc.) to other users in real-time.

SUMMARY

Aspects of the present disclosure relate to a computer program product, system, and method for dynamic adjustment of shared content within web conferences.

Web conference data associated with a web conference can be received. A determination can be made that a condition is met for adjusting shared content that is currently being shared within the web conference. An adjustment to make to the shared content that is currently being shared within the web conference can be determined. The shared content can be adjusted based on the determination to generate adjusted shared content. The adjusted shared content can be displayed within the web conference.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
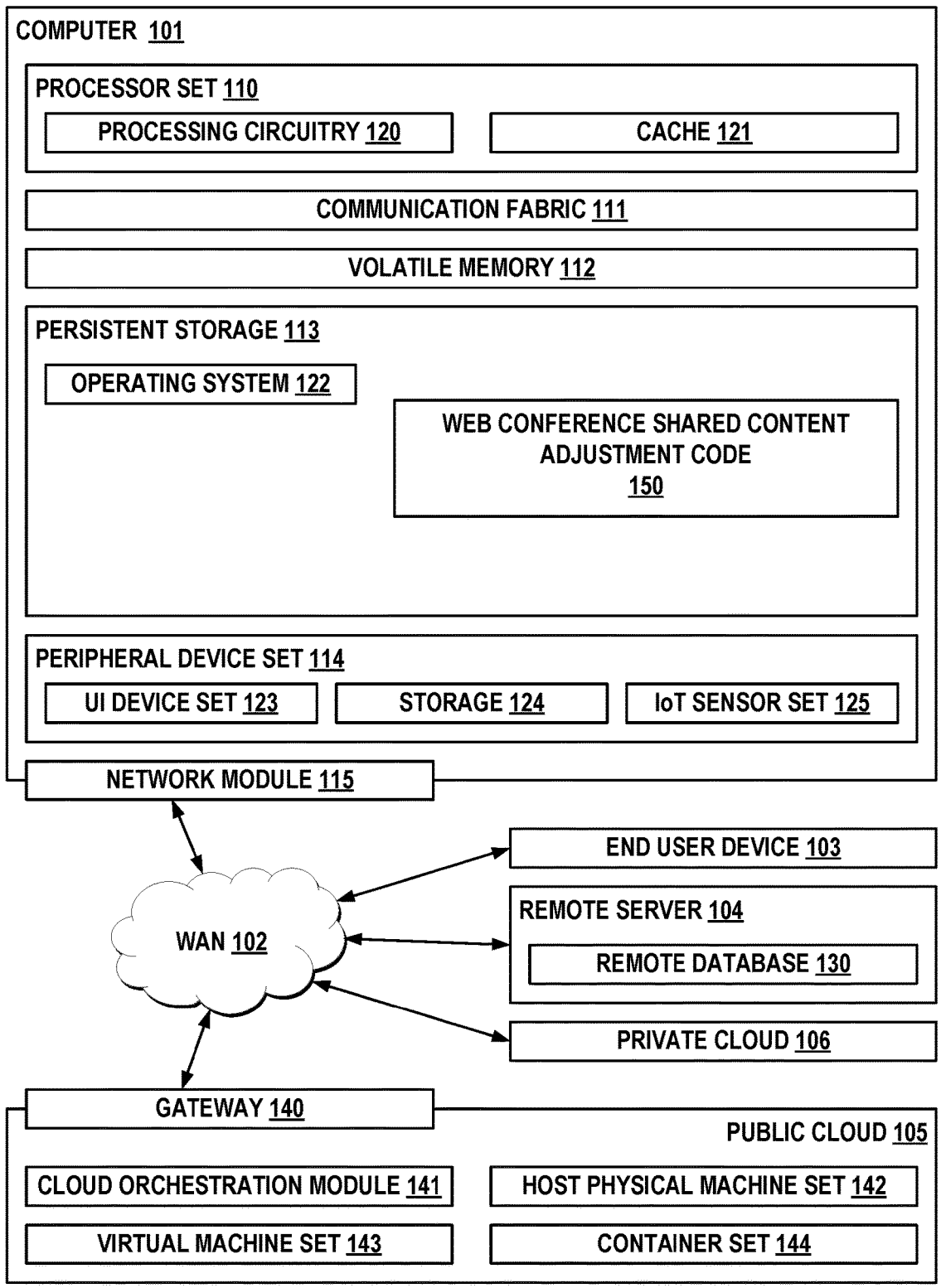
FIG. 1 is a high-level block diagram illustrating an example computer system and network environment that can be used in implementing one or more of the methods, tools, modules, and any related functions described herein, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing, and more particularly, to web conference shared content adjustment. While the present disclosure is not necessarily limited to such applications, various aspects of the disclosure may be appreciated through a discussion of various examples using this context.

As discussed above, web conferencing software facilitates communication between individuals online via transmission of audio/video (A/V) data of the individuals in real-time over a network. Web conferences can allow users to share content (e.g., images, video data, audio data, etc.) to other users in real-time. In certain scenarios, participants within web conferences may have difficulty viewing and understanding content shared by other participants. This can originate due to poor image resolution of the shared content, viewer disabilities (e.g., color blindness), hardware limitations (e.g., low resolution displays), cluttered content, and other factors. Aspects of the present disclosure recognize that content shared within web conferences may have various viewing hinderances. That is, the participants viewing the shared content may be hindered based on the characteristics of the shared content, network conditions, disabilities, and/or the hardware they are viewing the shared content on.

The following description provides examples of embodiments of the present disclosure, and variations and substitutions may be made in other embodiments. Several examples will now be provided to further clarify various aspects of the present disclosure.

Example 1: A computer-implemented method for dynamic adjustment of shared content within web conferences. The method comprises receiving web conference data associated with a web conference. The method further comprises determining that a condition is met for adjusting shared content that is currently being shared within the web conference. The method further comprises determining an adjustment to make to the shared content that is currently being shared within the web conference. The method further comprises adjusting the shared content based on the determination to generate adjusted shared content. The method further comprises causing the adjusted shared content to be displayed within the web conference.

The above limitations advantageously enable the adjustment of shared content within web conferences to improve participant viewing of shared content. Various conditions can be set to indicate that shared content within a web conference should be adjusted to improve participant viewing. As such, the above limitations selectively determine when to adjust shared content within a web conference when such a condition is met. This enhances processing efficiency, as shared content is only adjusted in response to a condition being met. Further, because conditions for adjusting shared content can be based on the web conference data, accurate identification of timings in which shared content should be adjusted can be attained. Thus, situations in which shared content is likely not clear, distinguishable, legible, or otherwise visually accessible by participants can be identified such that the shared content can be adjusted and made visually accessible to participants. Ultimately, web conferences are improved as content shared within web conferences is more likely to be accurately perceived and ingested by participants.

Example 2: The limitations of any of Examples 1 and 3-11, where determining that the condition is met comprises determining that a keyword defined within the condition associated with the shared content is uttered via speech during the web conference or input via a chat channel within the web conference. The above limitations advantageously enable conditions for adjusting shared content to be defined based on speech and/or text data. For example, if a user indicates that shared content is "unclear," "fuzzy," "illegible," or any other potential keyword that indicates the shared content is not readily understandable by participants, the shared content can be adjusted based on the identification of such keywords. This enhances processing efficiency as shared content may only be adjusted if such keywords associated with shared content are identified.

Example 3: The limitations of any of Examples 1-2 and 4-11, where determining that the condition is met comprises determining that a resolution of the shared content does not satisfy a resolution threshold, where the determined adjustment includes enhancing resolution of the shared content, wherein a generative adversarial network (GAN) model is configured to adjust the shared content by enhancing the resolution of the shared content to generate the adjusted shared content. The above limitations advantageously enable conditions for adjusting shared content to be defined based on the resolution of the shared content. As such, if the resolution of shared content is low (e.g., does not satisfy a resolution threshold), the shared content can be adjusted to enhance the resolution. The GAN model can accurately enhance the resolution of the shared content to increase visual accessibility of the shared content for participants on the web conference.

Example 4: The limitations of any of Examples 1-3 and 6-11, where causing the adjusted shared content to be displayed within the web conference includes modifying the shared content at a source that the shared content is being shared from. The above limitations advantageously enable the shared content to be adjusted at a source the shared content is shared from. This can enhance the shared content outside of the web conference environment (e.g., allowing the participant who shared the content to have an adjusted version for sharing outside of the web conference).

Example 5: The limitations of any of Examples 1-3 and 6-11, where causing the adjusted shared content to be displayed within the web conference includes overlaying the adjusted shared content over the shared content within a web conference interface of the web conference. The above limitations advantageously enable the shared content to be overlayed over the shared content within a web conference interface. Thus, the shared content may not be deleted, and a source of the shared content may not be modified. Rather, generated adjusted shared content can be overlayed on top of the shared content, enhancing processing efficiency.

Example 6: The limitations of any of Examples 1-5 and 7-11, where the adjustment to make to the shared content that is currently being shared within the web conference includes altering a color scheme of the shared content. The above limitations advantageously allow the shared content to be adjusted within an updated color scheme. This can enhance viewing of the shared content by participants of the web conference.

Example 7: The limitations of any of Examples 1-6 and 8-11, where the adjustment to make to the shared content that is currently being shared within the web conference comprises resizing or rotating the shared content. The above limitations advantageously allow the shared content to be adjusted by updating the size or orientation of the shared content. This can enhance viewing of the shared content by participants of the web conference.

Example 8: The limitations of any of Examples 1-7 and 9-10, where determining the adjustment to make to the shared content that is currently being shared comprises determining a set of critical areas of the shared content, determining a set of non-critical areas of the shared content, modifying the set of critical areas in a first manner, and modifying the set of non-critical areas in a second manner. The above limitations advantageously allow critical areas and non-critical areas of the shared content to be identified and updated in different manners. For example, critical areas can be updated in a manner to make them more visible, while non-critical areas can be updated in a manner to make them less visible. This can enhance viewing of the shared content by participants of the web conference. Further, as enhancements may be made to specific portions of the shared content, processing efficiency is improved, as all portions of the shared content may not be modified. Rather, only important (critical) areas of the shared content may be made more visually accessible and only unimportant (non-critical) areas of the shared content may be made less visually accessible.

Example 9: The limitations of any of Examples 8 and 10, where the set of critical areas and the set of non-critical areas are determined based on speech or text data indicating a frequency in which the set of critical areas and the set of non-critical areas are referenced within the speech or text data. The above limitations advantageously enable identification of the set of critical areas and the set of non-critical areas based on how often these areas are referenced in text and speech data within the web conference. This can increase the accuracy that the critical and non-critical areas are appropriately designated as such.

Example 10: The limitations of any of Examples 8-9, where the first manner includes adding colors to the set of critical areas, where the second manner includes converting colors of the non-critical areas to grayscale. The above limitations advantageously enable the critical areas have added colors to enhance viewability while the non-critical areas are converted to grayscale to reduce viewability.

Example 11: The limitations of any of Examples 1-7, where determining the adjustment to make to the shared content that is currently being shared comprises determining a set of critical areas of the shared content and generating a boarder around at least one critical area of the set of critical areas within the shared content. The above limitations advantageously enable the identification of critical areas of the shared content. Additionally, a boarder is generated around the critical areas which can enhance viewing of the critical areas by participants.

Example 12: A system comprising one or more processors and one or more computer-readable storage media collectively storing program instructions which, when executed by the one or more processors, are configured to cause the one or more processors to perform a method according to any one of Examples 1-11. The above limitations advantageously enable a system comprising one or more processors to perform and realize the advantages described with respect to Examples 1-11.

Example 13: A computer program product comprising one or more computer readable storage media, and program instructions collectively stored on the one or more computer readable storage media, the program instructions comprising instructions configured to cause one or more processors to perform a method according to any one of Examples 1-11. The above limitations advantageously enable a computer program product having program instructions configured to cause one or more processors to perform and realize the advantages described with respect to Examples 1-11.

Example 14: A computer-implemented method, system, or computer program product for dynamic adjustment of shared content within web conferences. The method, system, or computer program product comprises receiving web conference data associated with a web conference. The method, system, or computer program product further comprises determining that a condition is met for adjusting shared content that is currently being shared within the web conference. The method, system, or computer program product further comprises determining an adjustment to make to the shared content that is currently being shared within the web conference by determining a set of critical areas of the shared content and determining a set of non-critical areas of the shared content. The method, system, or computer program product further comprises adjusting the shared content based on the determination to generate adjusted shared content, wherein the set of critical areas are modified by adding colors to the set of critical areas and the set of non-critical areas are modified by converting colors of the non-critical areas to grayscale. The method, system, or computer program product further comprises causing the adjusted shared content to be displayed within the web conference.

The above example advantageously realizes the benefits described with respect to Examples 1, 8, and 10-12. The above example can be implemented within web conferences to adjust shared content that is rendered within color. For example, critical areas of the shared content can have color alterations to enhance brightness, contrast, intensity, etc. to make such critical areas more visually accessible to participants. Non-critical areas of the shared content can have their color converted to grayscale to make such non-critical areas less visually accessible to participants.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a high-level block diagram illustrating an example computing environment 100 that can be used in implementing one or more of the methods, tools, modules, and any related functions described herein, in accordance with embodiments of the present disclosure. Computing environment 100 contains an example of an environment for the execution of at least some of the computer code involved in performing the inventive methods, such as web conference shared content adjustment code 150. In addition, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and web conference shared content adjustment code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some or all of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in web conference shared content adjustment code 150 in persistent storage 113.

Communication fabric 111 includes the signal conduction paths that allow the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in web conference shared content adjustment code 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, mixed reality (MR) headset, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
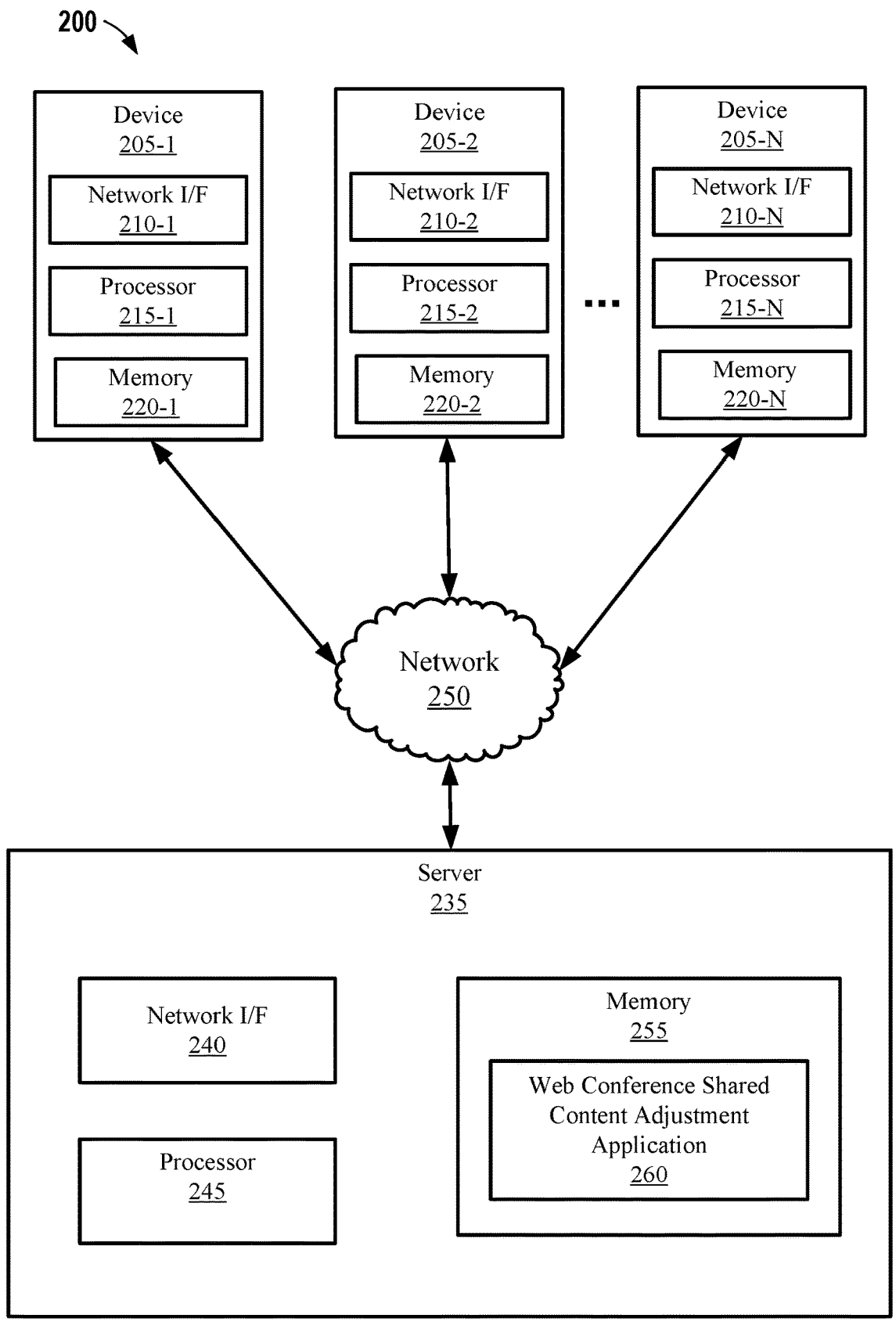
FIG. 2 is block diagram illustrating an example network environment, in accordance with embodiments of the present disclosure.

FIG. 2 is a block diagram illustrating an example computing environment 200 in which illustrative embodiments of the present disclosure can be implemented. Computing environment 200 includes a plurality of devices 205-1, 205-2, . . . , 205-N (collectively devices 205), at least one server 235, and a network 250.

The devices 205 and the server 235 include one or more processors 215-1, 215-2, 215-N (collectively processors 215) and 245 and one or more memories 220-1, 220-2, . . . , 220-N (collectively memories 220) and 255, respectively. The processors 215 and 245 can be the same as, or substantially similar to, processor set 110 of FIG. 1. The memories 220 and 255 can be the same as, or substantially similar to volatile memory 112 and/or persistent storage 113 of FIG. 1.

The devices 205 and the server 235 can be configured to communicate with each other through internal or external network interfaces 210-1, 210-2, . . . , 210-N (collectively network interfaces 210) and 240. The network interfaces 210 and 240 are, in some embodiments, modems or network interface cards. The network interfaces 210 and 240 can be the same as, or substantially similar to, network module 115 described with respect to FIG. 1.

The devices 205 and/or the server 235 can be equipped with a display or monitor. Additionally, the devices 205 and/or the server 235 can include optional input devices (e.g., a keyboard, mouse, scanner, a biometric scanner, video camera, or other input device), and/or any commercially available or custom software (e.g., web conference software, browser software, communications software, server software, natural language processing software, search engine and/or web crawling software, image processing software, augmented reality/virtual reality (AR/VR) software, etc.). For example, devices 205 and/or server 235 can be, or include, components/devices such as those described with respect to peripheral device set 114 of FIG. 1. The devices 205 and/or the server 235 can be servers, desktops, laptops, or hand-held devices. The devices 205 and/or the server 235 can be the same as, or substantially similar to, computer 101, remote server 104, and/or EUD 103 described with respect to FIG. 1.

The devices 205 and the server 235 can be distant from each other and communicate over a network 250. In some embodiments, the server 235 can be a central hub from which devices 205 can establish a communication connection, such as in a client-server networking model. Alternatively, the server 235 and devices 205 can be configured in any other suitable networking relationship (e.g., in a peer-to-peer (P2P) configuration or using any other network topology).

In some embodiments, the network 250 can be implemented using any number of any suitable communications media. In embodiments, the network 250 can be the same as, or substantially similar to, WAN 102 described with respect to FIG. 1. For example, the network 250 can be a wide area network (WAN), a local area network (LAN), an internet, or an intranet. In certain embodiments, the devices 205 and the server 235 can be local to each other and communicate via any appropriate local communication medium. For example, the devices 205 and the server 235 can communicate using a local area network (LAN), one or more hardwire connections, a wireless link or router, or an intranet. In some embodiments, the devices 205 and the server 235 can be communicatively coupled using a combination of one or more networks and/or one or more local connections. For example, the first device 205-1 can be hardwired to the server 235 (e.g., connected with an Ethernet cable) while the second device 205-2 can communicate with the server 235 using the network 250 (e.g., over the Internet).

In some embodiments, the network 250 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 250. In embodiments, network 250 can be coupled with public cloud 105 and/or private cloud 106 described with respect to FIG. 1.

The server 235 includes a web conference shared content adjustment application (WCSCAA) 260. WCSCAA 260 can be configured to perform various functionalities for adjusting shared content within web conferences to enhance viewing (e.g., visual accessibility) of the shared content for participants within the web conferences.

The WCSCAA 260 can be configured to collect web conference data (e.g., speech data, image data, and textual data associated with a web conference) to determine whether a condition is met for adjusting shared content within a web conference. In response to determining that a condition is met for adjusting shared content within the web conference, WCSCAA 260 can be configured to determine an adjustment to make to the shared content. The adjustment can include, among other adjustments, color modification, texture modification, resolution enhancement, rotation of shared content, and resizing of shared content. The specific adjustment that is determined to be made can depend on the condition used to determine that the adjustment should be executed. For example, detection of poor image quality can lead to a determination that resolution of the shared content should be enhanced. As another example, detecting speech indicating that the color scheme of shared content is confusing or indistinguishable can lead to a determination that the colors of the shared content should be modified.

The WCSCAA 260 can be configured to adjust the shared content based on the determined adjustment to generate adjusted content (e.g., adjusted shared content). The WCSCAA 260 can then cause display of the adjusted shared content within the web conference. This can include modifying the shared content at a source that the shared content is shared from (e.g., an application sharing the content), overlaying the adjusted shared content within the web conference interface (e.g., within the web conference application) at a location of the shared content, modifying the shared content as it is displayed within a web conference share window (e.g., without affecting the shared content at the source it is shared from), and/or replacing the shared content with adjusted shared content (e.g., deleting the shared content and inserting adjusted shared content at a same location within the web conference), among other potential manners for causing display of the adjusted shared content.

It is noted that FIG. 2 is intended to depict the representative major components of an example computing environment 200. In some embodiments, however, individual components can have greater or lesser complexity than as represented in FIG. 2, components other than, or in addition to, those shown in FIG. 2 can be present, and the number, type, and configuration of such components can vary.

While FIG. 2 illustrates a computing environment 200 with a single server 235, suitable computing environments for implementing embodiments of this disclosure can include any number of servers. The various models, modules, systems, and components illustrated in FIG. 2 can exist, if at all, across a plurality of servers and devices. For example, some embodiments can include two servers. The two servers can be communicatively coupled using any suitable communications connection (e.g., using a WAN 102, a LAN, a wired connection, an intranet, or the Internet).

Though this disclosure pertains to the collection of personal data (e.g., web conference data), it is noted that in embodiments, users opt into the system. In doing so, they are informed of what data is collected and how it will be used, that any collected personal data may be encrypted while being used, that the users can opt-out at any time, and that if they opt out, any personal data of the user is deleted.

Figure 3:
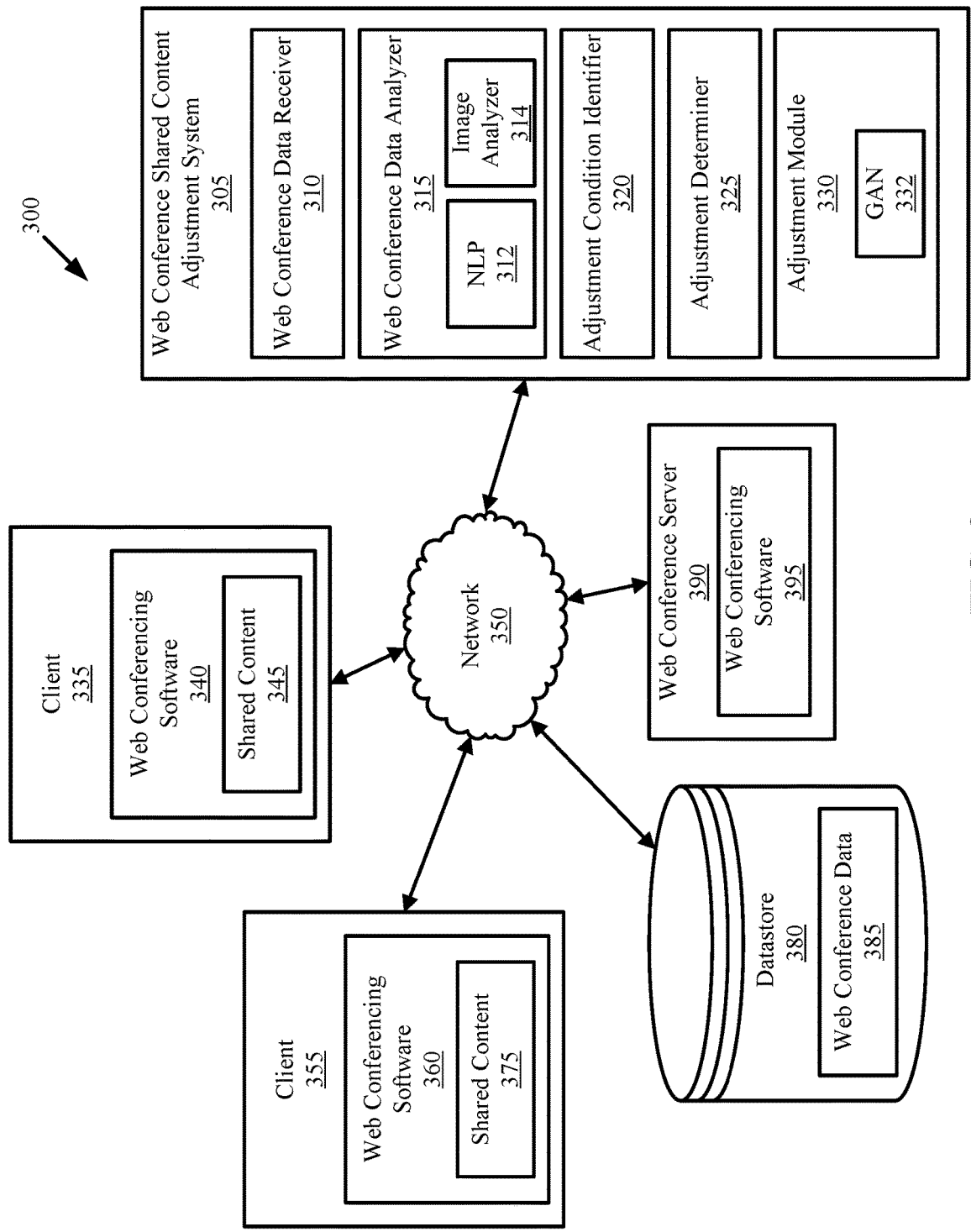
FIG. 3 is a block diagram illustrating an example network environment including a web conference shared content adjustment system, in accordance with embodiments of the present disclosure.

Referring now to FIG. 3, shown is a block diagram illustrating an example network environment 300 in which illustrative embodiments of the present disclosure can be implemented. The network environment 300 includes a web conference shared content adjustment system (WCSCAS) 305, clients 335 and 355, a web conference server 390, and a datastore 380, each of which can be communicatively coupled for intercomponent interaction via a network 350. In embodiments, the network 350 can be the same as, or substantially similar to, network 250 and/or WAN 102. In embodiments, the clients 335 and 355, WCSCAS 305, and/or web conference server 390 can be the same as, or substantially similar to, computer 101, peripheral device set 114, EUD 103, devices 205, and/or server 235.

Clients 335 and 355 each include web conferencing software 340 and 360, respectively. Each client 335 and 355 can communicate with web conference server 390 to facilitate web conferencing via web conferencing software 395 hosted by the web conference server 390. Any suitable number of clients can establish communication with web conference server 390 to participate in web conferences. The web conferencing software 395 hosted by web conference server 390 can facilitate the sharing of shared content 345 by the client 335 and shared content 375 by the client 355. Thus, clients can share content, such as images, videos, audio data, and the like, over network 350 via web conferencing software 340, 360, and 395. Though the implementation depicted in FIG. 3 includes two clients 335 and 355 and a web conference server 390, in embodiments, any suitable number of clients can be implemented. In some embodiments, a web conference server 390 may not be implemented, as the web conference can be hosted by a client or another system.

The WCSCAS 305 can be configured to automatically adjust shared content within web conferences to enhance participant viewing of the shared content. WCSCAS 305 includes a web conference data receiver 310, a web conference data analyzer 315, an adjustment condition identifier 320, and adjustment determiner 325, and an adjustment module 330. The functionalities of the web conference data receiver 310, web conference data analyzer 315, adjustment condition identifier 320, adjustment determiner 325, and adjustment module 330 can be processor-executable instructions that can be executed by a dedicated or shared processor using received inputs.

The web conference data receiver 310 can be configured to receive web conference data 385 associated with web conferences. Any suitable web conference data 385 can be received, including, but not limited to, audio/video (A/V) data corresponding to A/V streams of participants (e.g., participant video feeds), content shared by participants (e.g., via content share functionalities), textual data from web conference chat channels, web conference participant data (e.g., user identifications, user names, user roles, user characteristics, etc.), and web conference meeting data (e.g., meeting identification, meeting name, meeting time, etc.). The web conference data receiver 310 can begin receiving web conference data in response to user opt-in to functionalities of the WCSCAS 305.

The web conference data analyzer 315 can be configured to analyze the web conference data 385. Analyzing the web conference data 385 can include various data analysis/processing techniques for analyzing and processing textual, audio, and image data of web conferences. Natural language processing (NLP) 312 can be configured to perform various functionalities for text and speech processing of web conference data 385. NLP 312 techniques can include, among other techniques, speech recognition, speech segmentation, tokenization, morphological analysis (e.g., lemmatization, segmentation, part-of-speech tagging, stemming, etc.), syntactic analysis (e.g., parsing, sentence breaking, etc.), semantic analysis (e.g., named entity recognition (NER), terminology extraction, sentiment analysis, entity linking, etc.), text classification, and discourse analysis (e.g., topic segmentation and recognition, coreference resolution, implicit semantic role labeling, etc.). In embodiments, NLP 312 can be used to identify keywords or key phrases associated with shared content for identifying whether any conditions are met for adjusting shared content. That is, keywords associated with speech/text can be used for identifying shared content to be modified and specific modifications to make to shared content. Audio analysis techniques such as speech analytics (e.g., speech recognition, tone analysis, speech-to-text, etc.) can be performed on audio data of the web conference data 385. Speech analysis can be used to derive tones/emotions from speech uttered within the web conference, to be used for identifying shared content to be modified and specific modifications to make to shared content.

Image analyzer 314 can be configured to perform various image analysis/processing techniques on video feeds of participants within web conference data 385 and/or on shared content within the web conference. For example, image analyzer 314 can be configured to perform object recognition techniques (e.g., region-based convolutional neural networks (R-CNNs), you only look once (YOLO), scale-invariant feature transform (SIFT), and other object recognition techniques), visual sentiment analysis, image segmentation techniques (e.g., clustering), feature extraction, and pattern recognition. Image analyzer 314 may use various image processing techniques including anisotropic diffusion, neural networks, component analysis, linear filtering, pixelation, point feature matching, wavelets, hidden Markov models, and other techniques. In embodiments, image segmentation techniques can be used to segment shared content into segments to be used for determining areas of the shared content to be modified (e.g., critical areas and non-critical areas of the shared content). In embodiments, object recognition techniques can be used for determining shared content objects to be modified and/or portions of shared content objects to be modified.

The adjustment condition identifier 320 can be configured to determine whether a condition is met for shared content adjustment. Various conditions can be set which dictate whether shared content should be modified based on historical and/or real-time web conference data 385. The conditions for adjusting shared content can be based on web conference participant data (e.g., user data of the participants attending the web conference), real-time speech data, textual data (e.g., from a chat channel), image data of shared content, web conference meeting data (e.g., meeting title, meeting agenda, etc.), network data, and/or image data of participants (e.g., from video feeds of participants). Adjustment condition identifier 320 can identify whether any conditions are met for shared content adjustment while a live web conference is currently ongoing. That is, the adjustment of shared content can dynamically (e.g., automatically) occur at any point during a live web conference while content is being shared within the web conference based on an identified condition.

The adjustment determiner 325 can be configured to determine an adjustment to be made to the shared content. Various types of adjustments can be made to shared content including color adjustments (e.g., removing colors from shared content, adding colors to shared content, altering colors of shared content), texturing (e.g., adding and/or removing textures from shared content), resolution enhancement (e.g., increasing resolution of shared content), size alterations (e.g., enlarging shared content, reducing size of shared content, etc.), generating boarders around shared content, emboldening shared content, rotating shared content, or otherwise changing the appearance of shared content. In embodiments, the determined adjustment(s) depend on the identified adjustment condition.

The adjustment module 330 can be configured to execute the determined adjustment on the shared content (e.g., to generate adjusted shared content) and thereafter cause the adjusted shared content to be displayed within the web conference. In embodiments, the adjustment module 330 can be configured to modify the shared content at a source from which the shared content is shared from, such as an application, window, or screen that is being shared within the web conference. In some embodiments, adjustment module 330 can be configured to overlay adjusted shared content over the shared content within the web conference (e.g., within the web conference software 395). In some embodiments, adjustment module 330 can be configured to modify the shared content as it appears as displayed within a web conference share window (e.g., without affecting the shared content at the source it is shared from). In some embodiments, the adjustment module 330 can be configured to replace the shared content with generated adjusted shared content (e.g., deleting the shared content and inserting adjusted shared content at a same location within the web conference). However other potential manners for causing display of the adjusted shared content are contemplated.

Various examples of adjustment conditions, determined adjustments, and executed adjustments of shared content will now be referenced. The following adjustment conditions, determined adjustments, and executed adjustments of shared content are merely exemplary, and any suitable adjustment conditions, determined adjustments, and/or executed adjustments can be implemented without departing from the spirit and scope of the present disclosure.

In embodiments, a condition for shared content adjustment can be set such that if resolution of shared content falls below a resolution threshold, then the shared content is modified. This can be identified by adjustment condition identifier 320. For example, adjustment determiner 325 can be configured to determine, based on the resolution of the shared content not satisfying the resolution threshold, that the resolution of the shared content should be enhanced. In this example, the adjustment module 330 can be configured to enhance the resolution of the shared content per the determination of the adjustment determiner 325. In embodiments, the adjustment module 330 can include a generative adversarial network (GAN) 332 configured to enhance image resolution of shared content within web conferences.

GAN 332 is a type of machine learning framework where a discriminator model (e.g., a first neural network) and a generator model (e.g., a second neural network) can be cooperatively coupled to learn in an unsupervised manner. The discriminator can be configured to determine whether an input (e.g., adjusted shared content) is real or fabricated, and a generator can be configured to attempt to "fool" the discriminator by generating input data (e.g., fabricated shared content) for the discriminator. In the context of the present disclosure, the generator component of the GAN can be configured to generate shared content with enhanced image resolution. If the adjusted shared content generated by the generator is sufficient (e.g., to the discriminator), then the shared content can be adjusted per the generator's adjustment. Thus, shared content can be adjusted using GAN 332 and thereafter displayed within the web conference.

In embodiments, the GAN 332 model can include a generator neural network parameterized by a first set of weights and biases trained to generate high resolution images using low resolution images as inputs. Additionally, in embodiments, the GAN 332 model can include a discriminator neural network parameterized by a second set of weights and biases trained to discriminate high resolution images generated by the generator neural network from real image data (e.g., real high-resolution images). In this way, the generator neural network and discriminator neural network can be configured to generate high resolution images using low resolution images as inputs. Thus, low resolution shared content can be corrected using the GAN 332 model to improve image resolution.

In embodiments, adjustment condition identifier 320 can set a condition that dictates that if any participants are colorblind (e.g., as indicated within participant data of web conference data 385), and shared content within the web conference is within a color scheme that is indistinguishable (e.g., red and green) for colorblind participants, then the shared content is adjusted. In this example, the adjustment determiner 325 can be configured to determine areas of the shared content that should be adjusted (e.g., red and green pixels within the shared content that should be changed to a different color). The adjustment module 330 can then be configured to update the shared content, by changing the color of the pixels of the shared content per the determination of the adjustment determiner 325. For example, green and red pixels within the shared content can be changed to other colors. In some embodiments, rather than changing the color of the shared content, textures (e.g., patterns) can be added to the shared content to improve visual accessibility to participants on the web conference. See FIGS. 6 and 8. In embodiments, the GAN 332 model can be configured to automatically adjust the color scheme of shared content (e.g., to remove specific colors and add specific colors within shared content). Adjustment conditions can be defined based on any suitable participant data.

In embodiments, adjustment condition identifier 320 can set a condition that dictates if any keywords and/or key phrases are uttered and/or input within chat channels within the web conference, then shared content associated with the keywords can be adjusted. For example, real-time speech and text monitoring by web conference data analyzer 315 can occur during the web conference. The adjustment condition identifier 320 can determine whether any keywords and/or key phrases are uttered or input via a chat channel indicating that shared content should be adjusted, such as "illegible," "confusing," "indistinguishable," "don't understand," "fuzzy," "can't see," etc. In embodiments, such keywords and/or key phrases are determined to be in proximity to shared content object words to determine that the shared content should be adjusted (e.g., "I can't see shared object X"). In response to identifying keywords and/or key phrases associated with shared content, adjustments to the shared content can be made by the adjustment determiner 325.

The adjustment determiner 325 can then determine an adjustment to be made to the shared content, which can depend on the specific keyword(s) identified as associated with the shared content. For example, "fuzzy" may indicate that resolution of the shared content should be enhanced, whereas "colors are indistinguishable" may indicate that the color scheme of the shared content should be adjusted. As another example, "small" can indicate that the shared content should be enlarged whereas, "upside down" can indicate that the shared content should be rotated. Various adjustments can be determined based on different keywords. The adjustment module 330 can then make the adjustment determined by the adjustment determiner 325. In embodiments, the GAN 332 model can be configured to make the adjustment based on the identified keywords and/or key phrases associated with shared content objects. NLP 312 can aid in identifying keywords and/or key phrases associated with adjustment conditions.

In embodiments, the adjustment condition identifier 320 can be configured to determine that the shared content should be adjusted based on the color scheme of the shared content. For example, a condition can be set such that if any images within shared content are within a particular color scheme (e.g., grayscale, black and white, etc.), the shared content should be adjusted. In response to the adjustment condition identifier 320 identifying shared content within a color scheme defined in a condition, the adjustment determiner 325 can determine adjustments to be made to the shared content, which may include color scheme alteration and/or texture alteration. The adjustment module 330 can then be configured to adjust the shared content based on the determination (e.g., by changing the color scheme and/or adjusting the textures of the shared content). In embodiments, the GAN 332 can be configured to adjust the shared content.

In embodiments, the adjustment condition identifier 320 can be configured to determine that the shared content should be adjusted based on the size of the shared content. For example, a condition can be set such that if any images within shared content are below or above a size threshold, the shared content is adjusted. In response to the adjustment condition identifier 320 identifying shared content not satisfying an upper or lower size threshold, the adjustment determiner 325 can determine a size adjustment to be made to the shared content. The adjustment module 330 can then be configured to adjust the size of the shared content based on the identified condition. For example, if the shared content falls below a lower limit size threshold, then the size of the content can be increased. In contrast, if the shared content exceeds an upper limit size threshold, the size of the shared content can be reduced. In embodiments, the GAN 332 can be configured to adjust the size of the shared content.

In embodiments, the adjustment condition identifier 320 can be configured to determine that the shared content should be adjusted based an orientation of the shared content. For example, a condition can be set such that if any images within shared content are upside down or otherwise rotated, the shared content is adjusted. In embodiments, orientations can be determined using a recognition model, such as by analyzing the direction of text within the shared content or based on the direction of other features of the shared content. In response to the adjustment condition identifier 320 identifying shared content within a rotated direction, the adjustment determiner 325 can determine a rotation adjustment for the shared content. The adjustment module 330 can then be configured to adjust the orientation of the shared content based on the identified condition. For example, if the shared content is upside down, the shared content can be rotated right side up. As another example, if the shared content is rotated 90 degrees leftward, then the shared content can be adjusted by rotating it 90 degrees rightward (e.g., towards the proper orientation). In embodiments, the GAN 332 can be configured to rotate the shared content.

In embodiments, a condition can be set based on image data of participants collected from A/V streams of individuals on the web conference. The web conference data analyzer 315 can be configured to analyze sentiment and/or gaze direction of participants within the web conference (e.g., via image analyzer 314). In embodiments, the gaze direction of participants can be determined using eye-tracking technology. A condition can be set such that if a user is gazing at a shared content object (e.g., determined via eye-tracking) within the web conference and the user has a confused or uncertain sentiment as determined by image analyzer 314, then the shared content is adjusted. For example, if a user is confused when gazing at a diagram shared within the web conference, the WCSCAS 305 can identify the diagram the user is gazing at and additionally determine that the user has a confused/uncertain sentiment (e.g., a first sentiment). Thus, WCSCAS 305 can determine an adjustment condition is met. Thereafter, the adjustment determiner 325 can determine an adjustment to make to the shared content (e.g., by adjusting the color, texture, size, rotation, etc.) and the adjustment module 330 can execute the determined adjustment. As such, aspects of the present disclosure contemplate that an adjustment condition can be set based on a determination that a participant is gazing at shared content while the participant has a first sentiment (e.g., a first expression or emotion).

In embodiments, in response to the adjustment condition identifier 320 identifying an adjustment condition, the adjustment determiner 325 can be configured to determine a set of critical areas of the shared content and a set of non-critical areas of the shared content. The set of critical areas can be areas of the shared content that are particularly important for viewing while the set of non-critical areas can be areas of the shared content that are relatively unimportant for viewing. In embodiments, the set of critical areas and non-critical areas can be determined based on NLP 312 analysis of the web conference. For example, critical and non-critical areas can be determined based on how often certain areas of the shared content are referenced within speech or text during the web conference. Alternatively or additionally, the set of critical and non-critical areas can be determined via gaze-tracking of participants. For example, the set of critical and non-critical areas can be determined based on how often participants are viewing certain areas of the shared content. However, the set of critical areas and non-critical areas can be determined in any other manner. In embodiments, the set of critical areas and the set of non-critical areas can be manually designated by a user.

The adjustment determiner 325 can then be configured to determine that the critical areas should be adjusted in a manner to make the set of critical areas more visible (e.g., more visually accessible) and that the non-critical areas should be adjusted in a manner to make the non-critical areas less visible (e.g., less visually accessible). For example, the adjustment determiner 325 can determine to add colors, highlight (e.g., increase brightness), enhance resolution, increase size, rotate, or otherwise adjust the critical areas of the shared content to make the critical areas more visible (e.g., a higher level of visual accessibility). In embodiments, a border can be generated around each of the critical areas of the set of critical areas. The adjustment determiner 325 can determine to remove colors (e.g., convert to grayscale), reduce size, rotate, dim, or otherwise adjust the non-critical areas of the shared content to make the non-critical areas less visible (e.g., a lower level of visual accessibility).

The adjustment module 330 can cause the shared content to be displayed within the web conference. This can include directly modifying the shared content at a source (e.g., an application such as a word processing application, presentation application, graphic design application, etc.) the shared content is shared from. Alternatively or additionally, this can include modifying the shared content as it is displayed within a web conference share window (e.g., without affecting the shared content at the source it is shared from). Alternatively or additionally, this can include replacing the shared content with adjusted shared content (e.g., deleting the shared content and inserting adjusted shared content at a same location within the web conference). Alternatively or additionally, this can include overlaying adjusted shared content over the shared content.

In embodiments, feedback can be requested from participants regarding the adjusted shared content. The feedback can indicate that the adjustment of the shared content was helpful (e.g., positive) or unhelpful (e.g., negative). The feedback can then be input into the WCSCAS 305 such that modifications to adjustment conditions, adjustment determinations, and/or adjustment executions (e.g., by GAN 332) can better match user intentions in the future. That is, negative feedback can lead to changes to adjustment conditions, determinations, and/or executions, whereas positive feedback can reinforce adjustment conditions, determinations, and executions. Modification to adjustment conditions, determinations, and/or executions based on feedback can be completed using a machine learning algorithm (e.g., reinforcement learning).

It is noted that FIG. 3 is intended to depict the representative major components of an example computing environment 300. In some embodiments, however, individual components can have greater or lesser complexity than as represented in FIG. 3, components other than or in addition to those shown in FIG. 3 can be present, and the number, type, and configuration of such components can vary.

Figure 4:
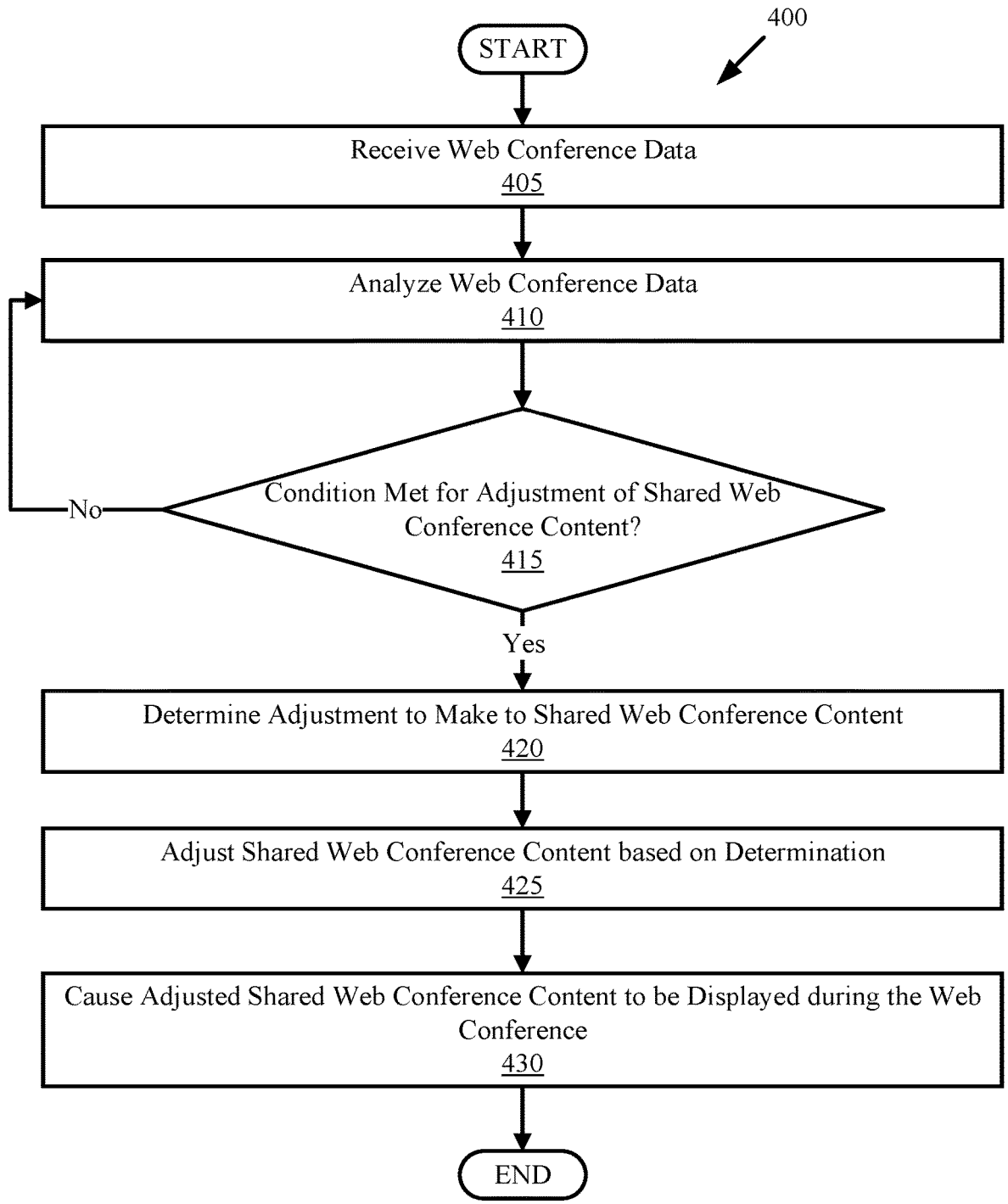
FIG. 4 is a flowchart illustrating an example method for web conference shared content adjustment, in accordance with embodiments of the present disclosure.

Referring now to FIG. 4, shown is a flowchart of an example method 400 for web conference shared content adjustment, in accordance with embodiments of the present disclosure. One or more operations of method 400 can be completed by one or more processing circuits (e.g., computer 101, devices 205, server 235, clients 335 and 355, WCSCAS 305, web conference server 390).

Method 400 initiates at operation 405, where web conference data is received. The web conference data can be the same as, or substantially similar to, web conference data 385 of FIG. 3. Web conference data can include web conference participant data, web conference meeting data, A/V streams of participants, shared content, textual data from chat channels, eye-tracking data, application data, and network data, among other types of web conference data.

The web conference data is then analyzed. This is illustrated at operation 410. Analyzing the web conference data can be completed in the same, or a substantially similar manner, as described with respect to web conference data analyzer 315 of FIG. 3. For example, NLP and/or image analysis techniques can be used to process/analyze the web conference data.

A determination is made whether a condition is met for adjustment of shared web conference content. This is illustrated at operation 415. Determining whether a condition is met for adjustment of shared web conference content can be completed in the same, or a substantially similar manner, as described with respect to adjustment condition identifier 320 of FIG. 3.

If a determination is made that a condition is met for adjusting web conference shared content, then a determination is made regarding the adjustment to make to the shared web conference content. This is illustrated at operation 420. The specific adjustment to make can depend on the condition used to identify that the adjustment should be made. Determining adjustments to make to shared content can be completed in the same, or a substantially similar manner, as described with respect to the adjustment determiner 325 of FIG. 3.

The shared web conference content is then adjusted based on the determination at operation 420. This is illustrated at operation 425. Adjusting the shared content of the web conference can be completed in the same, or a substantially similar manner, as described with respect to the adjustment module 330 of FIG. 3. The adjusted content can then be displayed within the web conference. This is illustrated at operation 430.

The aforementioned operations can be completed in any order and are not limited to those described. Additionally, some, all, or none of the aforementioned operations can be completed, while still remaining within the spirit and scope of the present disclosure.

Figure 5:
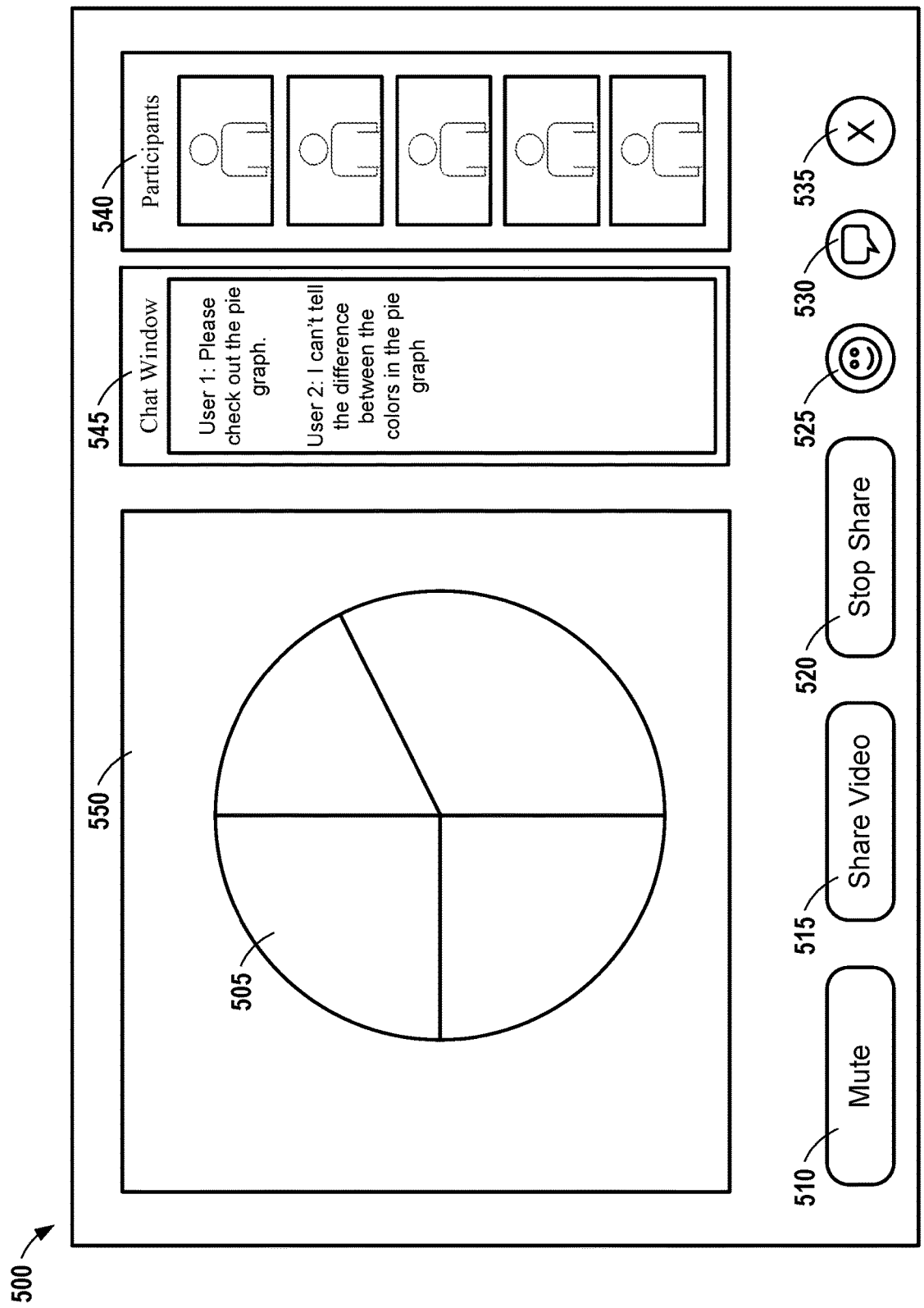
FIG. 5 is a diagram depicting an exemplary web conference user interface (UI) displaying shared content, in accordance with embodiments of the present disclosure.

Referring now to FIG. 5, shown is an example web conference interface 500, in accordance with embodiments of the present disclosure. As shown in FIG. 5, shared content 505 (e.g., a pie graph) is currently being shared within a share window 550 of the web conference interface 500. The web conference interface includes a mute button 510 (e.g., allowing participants to mute/unmute themselves during the web conference), a share video button 515 (e.g., allowing participants to opt to share video data as captured by a camera of their device), a stop share button 520 (e.g., allowing a participant to stop sharing the shared content 505), an emoji button 525 (e.g., allowing participants to share reactions/emoji's to react to events within the web conference), a chat button 530 (e.g., allowing participants to view chat window 545), and a leave button 535 (e.g., allowing participants to leave and/or end the web conference). The web conference interface 500 further includes a chat window 545 allowing participants to transmit text. The web conference interface 500 further includes a participants list 540, allowing participants to view video feeds, profile pictures, and other participant data of other participants within the web conference. The web conference interface 500 will be referenced throughout FIGS. 5-8.

As depicted in FIG. 5, a participant of the web conference is currently sharing content 505 (e.g., the share button 520 current reads "stop share"). Within chat window 545, a first participant indicates that the participants should view the pie graph (e.g., shared content 505). However, a second participant indicates that they cannot tell the difference between the colors in the pie graph. The WCSCAS 305 can then perform NLP and/or image analysis on the conversation within the chat window 545 to determine that a condition is met for shared content adjustment. The analysis can consider the appearance of the shared content 505 and/or A/V data of video feeds of participants within the participant list 540. In this example, keywords and/or key phrases associated with the shared content 505 can indicate that an adjustment should be completed based on a condition. For example, the key phrase "can't tell the difference between the colors" may be incorporated within a condition for adjusting the pie graph.

Figure 6:
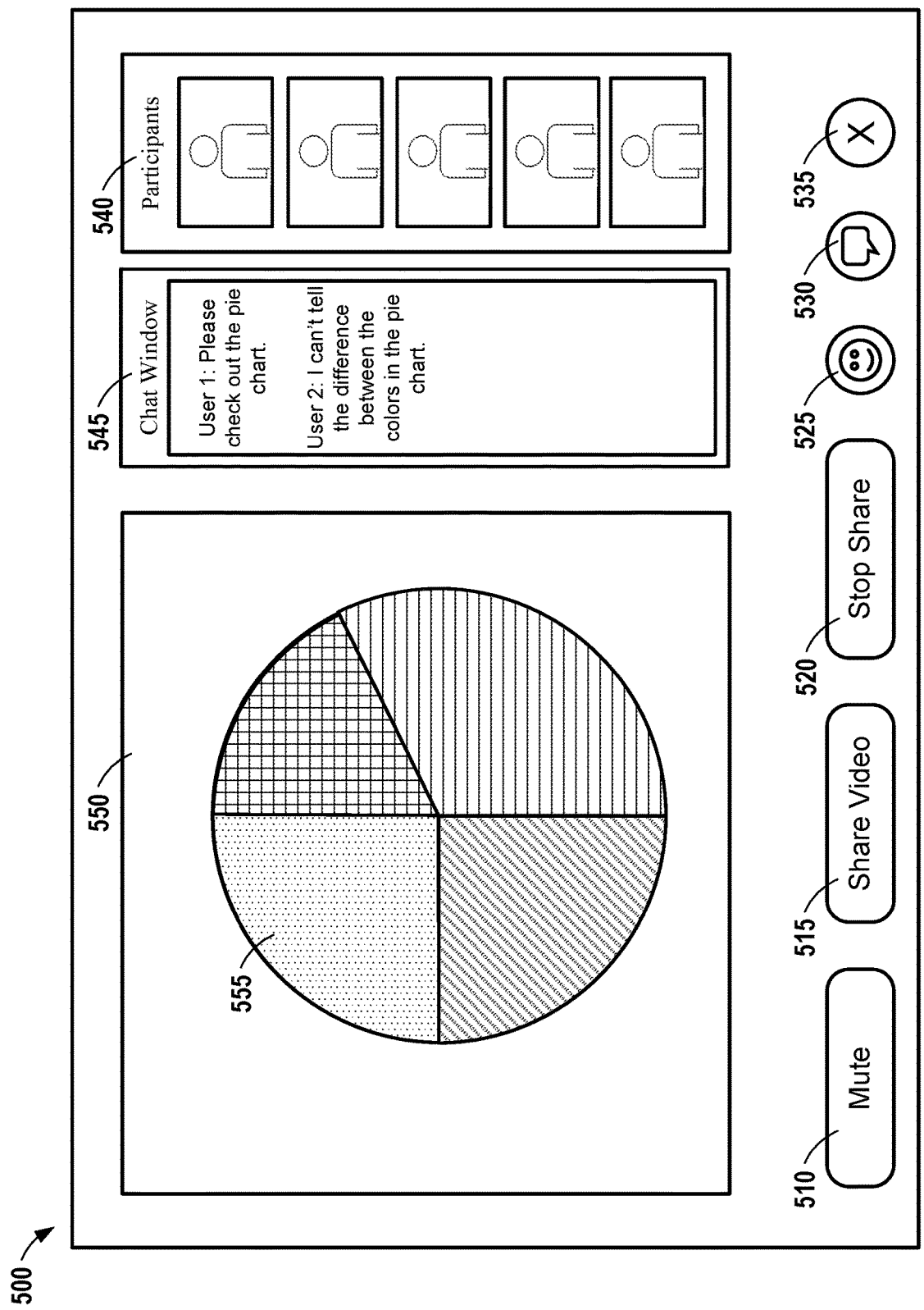
FIG. 6 is a diagram depicting an exemplary web conference UI displaying adjusted shared content, in accordance with embodiments of the present disclosure.

Referring now to FIG. 6, adjusted shared content 555 is now visible to participants within the web conference share window 550. The adjusted shared content 555 includes modified textures of the pie graph (e.g., modified textures of the shared content 505). In particular, each slice of the pie graph has been modified with a different texture. This is completed such that the participants can clearly see the difference between the slices within the pie graph. Though an example adjustment is shown in FIG. 6 as including texture alterations, in embodiments, color modifications, resizing, rotating, resolution enhancement, bordering, noise reduction, and other adjustments can be made to shared content based on analyzing web conference data.

The manner in which the adjusted shared content 555 is made visible to participants on the web conference can vary. For example, a source of the pie graph (e.g., an application which the pie graph is shared from) can be updated with the adjusted shared content 555. In some embodiments, the adjusted shared content 555 can be overlayed over the shared content 505. In some embodiments, the shared content 505 can be deleted (e.g., erased) and replaced with adjusted shared content 555. In some embodiments, the shared content 505 can be directly modified within share window 550 as displayed within web conference interface 500.

Figure 7:
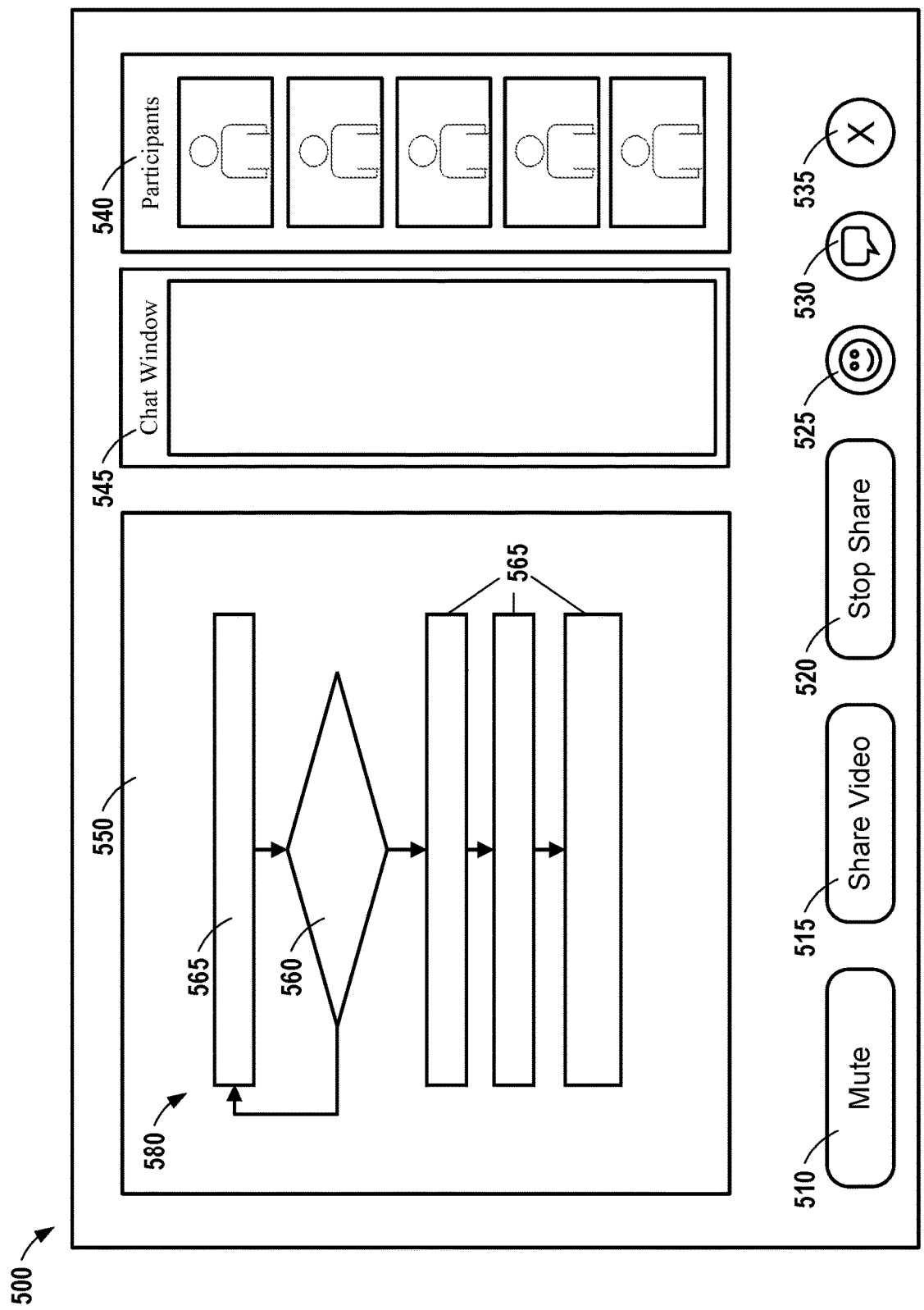
FIG. 7 is a diagram depicting an exemplary web conference UI displaying shared content, in accordance with embodiments of the present disclosure.

Referring now to FIG. 7, shown is the web conference interface 500 depicting the sharing of shared content 580 (e.g., a flowchart). In response to identifying a condition for adjusting the shared content 580 (e.g., which can be any condition described above), a critical area 560 (e.g., a decision block) of the flowchart is identified and a set of non-critical areas 565 of the flowchart is identified. The critical area 560 and the non-critical areas 565 can be determined based on speech/text data of the web conference (e.g., the decision block is frequently discussed) and/or based on video feeds/eye-tracking of participants within the web conference (e.g., the decision block is frequently being gazed by participants), among other methods.

Figure 8:
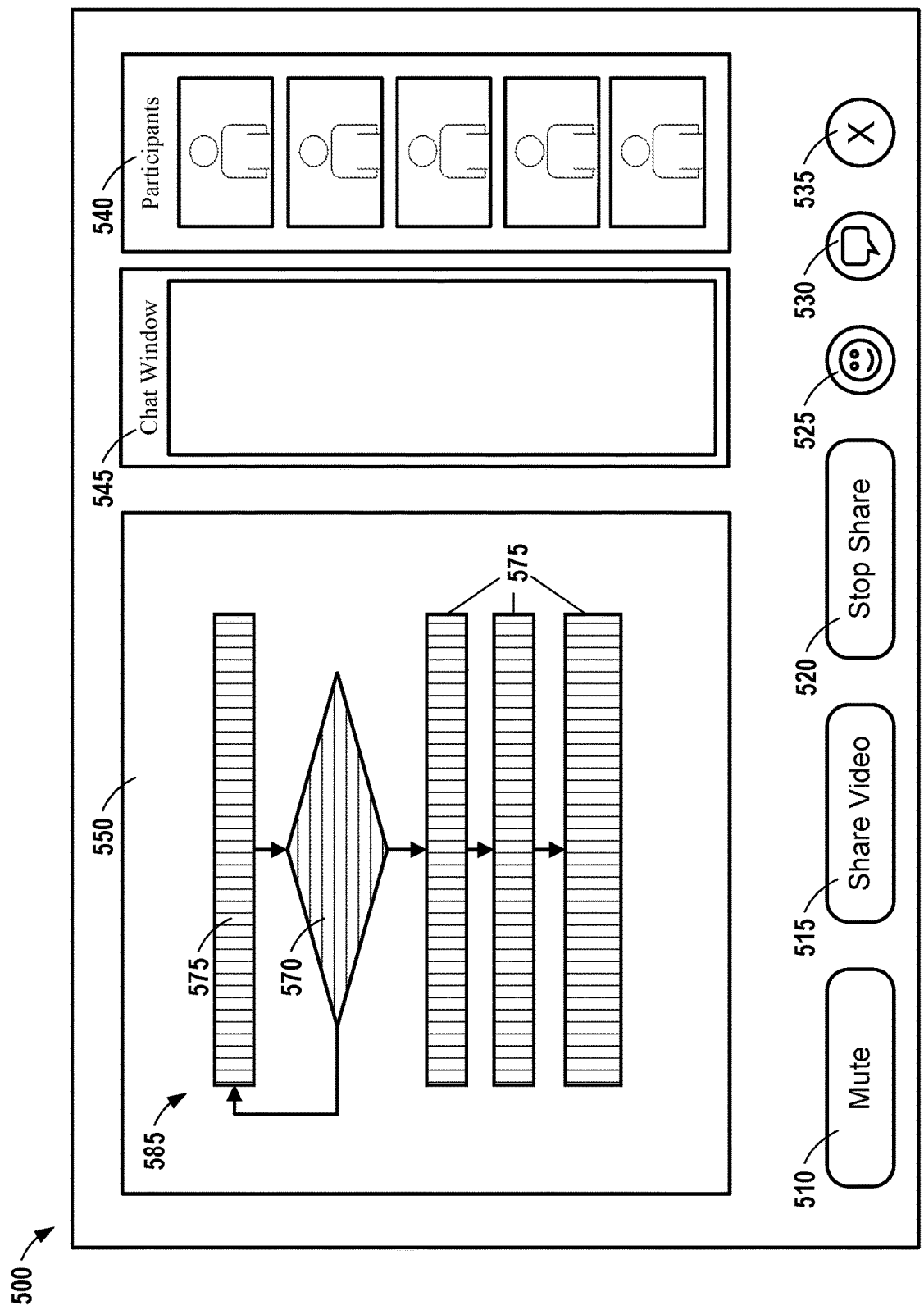
FIG. 8 is a diagram depicting an exemplary web conference UI displaying adjusted shared content, in accordance with embodiments of the present disclosure.

Referring now to FIG. 8, the flowchart is replaced with an adjusted flowchart (e.g., adjusted shared content 585). The adjusted flowchart includes an adjustment to the critical area 570 (e.g., the decision block) and adjustments to the non-critical areas 575. As depicted in FIG. 8, the critical area 570 is updated with a first texture and the set of non-critical areas 575 are updated with a second texture. The textures depicted in FIG. 8 are merely for aid in understanding aspects of the present disclosure. Any suitable adjustment can be made to critical areas 570 and any suitable adjustment can be made to non-critical areas 575. For example, the critical area 570 can be adjusted in a manner to make the critical area more visible and the non-critical areas can be adjusted in a manner to make the non-critical areas less visible. For example, to make the critical area 570 more visible, WCSCAS 305 can be configured to add colors, highlight elements, enhance resolution, increase size, rotate, generate a boarder around, or otherwise adjust the critical area 570 of the shared content to make the critical area 570 more visible. To make the non-critical areas 575 less visible, the WCSCAS 305 can be configured to remove colors (e.g., convert to grayscale), reduce size, rotate, dim, or otherwise adjust the non-critical areas 575 of the shared content to make the non-critical areas 575 less visible.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to those skilled in the art. Therefore, it is intended that the following claims be interpreted as covering all such alterations and modifications as fall within the true spirit and scope of the disclosure.

What is claimed is:

1. A computer-implemented method comprising:
   receiving web conference data associated with a web conference;
   determining that a condition is met for adjusting shared content that is currently being shared within the web conference;
   determining an adjustment to make to the shared content that is currently being shared within the web conference;
   adjusting the shared content based on the determination to generate adjusted shared content; and
   causing the adjusted shared content to be displayed within the web conference.

2. The computer-implemented method of claim 1, wherein determining that the condition is met comprises:
   determining that a keyword defined within the condition associated with the shared content is uttered via speech during the web conference or input via a chat channel within the web conference.

3. The computer-implemented method of claim 1, wherein determining that the condition is met comprises:
   determining that a resolution of the shared content does not satisfy a resolution threshold, wherein the determined adjustment includes enhancing resolution of the shared content, wherein a generative adversarial network (GAN) model is configured to adjust the shared content by enhancing the resolution of the shared content to generate the adjusted shared content.

4. The computer-implemented method of claim 1, wherein causing the adjusted shared content to be displayed within the web conference includes modifying the shared content at a source that the shared content is being shared from.

5. The computer-implemented method of claim 1, wherein causing the adjusted shared content to be displayed within the web conference includes overlaying the adjusted shared content over the shared content within a web conference interface of the web conference.

6. The computer-implemented method of claim 1, wherein the adjustment to make to the shared content that is currently being shared within the web conference includes altering a color scheme of the shared content.

7. The computer-implemented method of claim 1, wherein the adjustment to make to the shared content that is currently being shared within the web conference comprises resizing or rotating the shared content.

8. The computer-implemented method of claim 1, wherein determining the adjustment to make to the shared content that is currently being shared comprises:
- determining a set of critical areas of the shared content;
- determining a set of non-critical areas of the shared content;
- modifying the set of critical areas in a first manner; and
- modifying the set of non-critical areas in a second manner.

9. The computer-implemented method of claim 8, wherein the set of critical areas and the set of non-critical areas are determined based on speech or text data indicating a frequency in which the set of critical areas and the set of non-critical areas are referenced within the speech or text data.

10. The computer-implemented method of claim 8, wherein the first manner includes adding colors to the set of critical areas, wherein the second manner includes converting colors of the non-critical areas to grayscale.

11. The computer-implemented method of claim 1, wherein determining the adjustment to make to the shared content that is currently being shared comprises:
- determining a set of critical areas of the shared content; and
- generating a boarder around at least one critical area of the set of critical areas within the shared content.

12. A system comprising:
- one or more processors; and
- one or more computer-readable storage media collectively storing program instructions which, when executed by the one or more processors, are configured to cause the one or more processors to perform a method comprising:
  - receiving web conference data associated with a web conference;
  - determining that a condition is met for adjusting shared content that is currently being shared within the web conference;
  - determining an adjustment to make to the shared content that is currently being shared within the web conference;
  - adjusting the shared content based on the determination to generate adjusted shared content; and
  - causing the adjusted shared content to be displayed within the web conference.

13. The system of claim 12, wherein determining the adjustment to make to the shared content that is currently being shared comprises:
- determining a set of critical areas of the shared content;
- determining a set of non-critical areas of the shared content;
- modifying the set of critical areas in a first manner; and
- modifying the set of non-critical areas in a second manner.

14. The system of claim 13, wherein the first manner includes adding colors to the set of critical areas, wherein the second manner includes converting colors of the non-critical areas to grayscale.

15. The system of claim 12, wherein determining the adjustment to make to the shared content that is currently being shared comprises:
- determining a set of critical areas of the shared content; and
- generating a boarder around at least one critical area of the set of critical areas within the shared content.

16. The system of claim 12, wherein determining that the condition is met comprises:
- determining that a keyword defined within the condition associated with the shared content is uttered via speech during the web conference or input via a chat channel within the web conference.

17. The system of claim 12, wherein determining that the condition is met comprises:
- determining that a resolution of the shared content does not satisfy a resolution threshold, wherein the determined adjustment includes enhancing resolution of the shared content, wherein a generative adversarial network (GAN) model is configured to adjust the shared content by enhancing the resolution of the shared content to generate the adjusted shared content.

18. A computer program product comprising one or more computer readable storage media, and program instructions collectively stored on the one or more computer readable storage media, the program instructions comprising instructions configured to cause one or more processors to perform a method comprising:
- receiving web conference data associated with a web conference;
- determining that a condition is met for adjusting shared content that is currently being shared within the web conference;
- determining an adjustment to make to the shared content that is currently being shared within the web conference;
- adjusting the shared content based on the determination to generate adjusted shared content; and
- causing the adjusted shared content to be displayed within the web conference.

19. The computer program product of claim 18, wherein determining the adjustment to make to the shared content that is currently being shared comprises:
- determining a set of critical areas of the shared content;
- determining a set of non-critical areas of the shared content;
- modifying the set of critical areas in a first manner; and
- modifying the set of non-critical areas in a second manner.

20. The computer program product of claim 19, wherein the first manner includes adding colors to the set of critical areas, wherein the second manner includes converting colors of the non-critical areas to grayscale.

* * * * *